(12) United States Patent
Daniel

(10) Patent No.: US 8,256,960 B2
(45) Date of Patent: Sep. 4, 2012

(54) SEAL OF AN OPENING

(75) Inventor: Patrick Daniel, Kirkel (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 509 days.

(21) Appl. No.: 12/499,476

(22) Filed: Jul. 8, 2009

(65) Prior Publication Data

US 2010/0008605 A1 Jan. 14, 2010

(30) Foreign Application Priority Data

Jul. 9, 2008 (DE) .................... 10 2008 032 277

(51) Int. Cl.
*F16C 29/06* (2006.01)
*F16B 39/22* (2006.01)

(52) U.S. Cl. .......................... 384/13; 411/301

(58) Field of Classification Search .............. 384/13, 384/43–45; 411/301; 277/628, 630, 637; 285/901; 138/89–90
See application file for complete search history.

(56) References Cited

U.S. PATENT DOCUMENTS

| | | | |
|---|---|---|---|
| 3,259,404 A * | 7/1966 | Papenguth | 285/212 |
| 3,326,260 A | 6/1967 | Tucker | |
| 6,142,186 A * | 11/2000 | Donovan | 138/89 |
| 6,155,575 A * | 12/2000 | Hawkins et al. | 277/591 |
| 7,025,552 B2 * | 4/2006 | Grubert et al. | 411/546 |
| 2003/0025279 A1* | 2/2003 | Sugiyama | 277/628 |
| 2007/0095414 A1* | 5/2007 | Dorn et al. | 138/44 |

FOREIGN PATENT DOCUMENTS

| | | | |
|---|---|---|---|
| DE | 31 23 580 A1 | 2/1983 | |
| DE | 8204470 U1 | 7/1983 | |
| DE | 10 2005 051 598 A1 | 5/2007 | |
| EP | 1 881 210 A | 1/2008 | |
| GB | 872 939 A | 7/1961 | |
| JP | 56028351 A * | 3/1981 | 277/630 |
| WO | 92/09816 A | 6/1992 | |

* cited by examiner

*Primary Examiner* — Thomas R Hannon

(74) *Attorney, Agent, or Firm* — Lucas & Mercanti, LLP; Klaus P. Stoffel

(57) ABSTRACT

A seal for an opening of a bore in a component, with a threaded screw, around a core shaft of which a helical screw thread is arranged. The screw engages in the bore and the thread creates a mating thread in a wall of the bore. The diameter of the bore is larger than the diameter of the core shaft. A helical channel, which is located between the core shaft of the screw and a wall of the bore, and which is delimited by the thread, is interrupted at a minimum of one point in a liquid-tight and/or gas-tight manner.

10 Claims, 1 Drawing Sheet

SEAL OF AN OPENING

This application claims the priority of DE 10 2008 032 277.6 filed Jul. 9, 2008, which is incorporated by reference herein.

BACKGROUND OF THE INVENTION

The present invention pertains to a seal of an opening of a bore provided in a component.

A screw provided with three threaded sections arranged one after the other is known from DE 82 04 470 U, for example, wherein these threaded sections comprise a so-called trilobate thread form. These types of screws comprise not only excellent self-locking, thread-forming properties, but also the property of producing an excellent seal between the thread of the screw and the mating thread. It can be a disadvantage of these types of screws, however, that, when they are screwed into a bore in a component, the large amount of material which is displaced can cause the component to fracture. Another disadvantage can be seen in the fact that these types of screws are complicated to manufacture.

SUMMARY OF THE INVENTION

The goal of the present invention is therefore to provide a seal of an opening in a bore provided in a component, where the threaded screw guarantees a proper seal and where the seal is also easy to produce.

The goal is achieved by the seal according to the present invention. Because a diameter of the bore is larger than a diameter of the core shaft, it is ensured, first, that high stresses in the component containing the bore are avoided.

The term "bore" is used in the invention to denote a cylindrical recess, which, for example, can be produced by machining with chip-producing tools, in an injection mold without the need for cutting, or by the use of forming tools. The "opening" of the bore denotes an open end of a bore.

In the case of the inventive seal, the threaded screw comprises, in a known manner, a thread, which winds helically around the core shaft. A helical channel, which is located between the core shaft of the threaded screw and a bore wall of the bore and which is bounded by the thread is interrupted at least at one point in a liquid-tight and/or gas-tight manner. Accordingly, it is sufficient according to the invention to interrupt this helical channel at a minimum of one point.

In addition, the helical channel can also serve as a receptacle space for accepting the material displaced when the screw is screwed in. Ductile materials are suitable for the invention, especially for the component provided with the bore, so that the mating thread can be easily produced by displacement of the material.

Conventional screws, for example, can be provided for an inventive seal, wherein the only measure to be taken is to ensure that a diameter of the bore is larger than a diameter of the core shaft of the screw. The bore diameter must be large enough that only the tip of the thread creates the mating thread in the wall of the bore by displacement of material of the component.

In contrast to known seals with thread-cutting screws, the thread of the screw according to the invention does not bear almost completely against the mating thread; this has the effect of avoiding high frictional forces and high stresses. After the screw has been screwed into the bore of the component under simultaneous cutting of the internal thread, it is true that oil, for example, could flow through the previously mentioned helical channel which has been formed. In the inventive manner, however, this helical channel is interrupted in a liquid-tight and/or gas-tight manner.

The liquid-tight and/or gas-tight interruption can be achieved, for example, by introducing spots of sealant into separate points of this helical channel to seal off the helical channel.

In a further embodiment according to the invention, it is provided that the bores comprise a radial constriction, such as a flattened area, at a minimum of one point on the circumference, wherein a radial distance between the constriction and the opposing wall of the bore is dimensioned in such a way that, after the screw has been screwed in, the constriction interrupts the helical channel in a liquid-tight and/or gas-tight manner. Only in the area of the constriction does material of the component intrude completely into the helical channel and bears with a sealing action against the bore wall on one side and against the core shaft and the thread of the screw on the other side.

In the area of the constriction, the radial distance is preferably equal to or less than the diameter of the core shaft of the screw. The constriction can extend along the bore axis by the same distance as that over which the screw engages in the bore. It can also be sufficient, however, for the constriction to extend only over a short section of the bore, possibly, for example, over the axial dimension of one turn.

In an alternative embodiment according to the invention, a sealing strip extending along the bore is located between the screw and the component; this strip bears in a liquid-tight and/or gas-tight manner against the bore wall on one side and against the core shaft and the thread of the screw on the other side. In the case of this inventive embodiment, this sealing strip can, for example, extend over the entire length of the bore. In this case, the sealing strip is divided by means of the thread of the screw, in correspondence with the number of turns of the thread, into a plurality of sealing strip sections. Each of these sealing strip sections can bear in the helical channel in a liquid-tight and/or gas-tight manner against the bore wall on one side and against the core shaft and the thread of the screw on the other side.

This sealing strip is preferably a bead formed as an integral part of the component. This bead can project radially inward from the bore wall and extend along the axis of the bore. Thus a seal can be obtained in a simple manner. The integral sealing strip can be obtained conveniently when the component is a plastic part produced by the injection-molding process. The sealing strip, i.e., the bead, for example, can be easily provided in the injection mold and can be formed out of a plastic different from that of the component itself. Thus, in conjunction with a conventional screw, a component produced from plastic by the injection-molding process can easily lead to the inventive seal without the need for any special measures or complicated screws.

It has already been mentioned above that it can be sufficient in the inventive manner to interrupt the helical channel at only a single point. To increase the effectiveness of the seal or to improve its reliability, it is also possible to interrupt the helical channel in a liquid-tight and/or gas-tight manner at several separate points distributed around the circumference of the bore. This means, for example, that spots of sealing material can be introduced at these points.

In the case of another inventive seal, it can be sufficient for the area of the first few turns of the screw at the end facing away from the screwed-in end to be provided with sealant, which should engage completely into the grooves of the thread. When this screw is screwed into the appropriately adapted bore of the component, only the tips of the thread engage in the wall of the bore and displace the material to create the mating thread; once the screw has been screwed in completely in the intended manner, the grooves of the screw filled with the sealant will have meshed with the mating thread, so that here, too, it is ensured that the helical channel is interrupted in a liquid-tight and/or gas-tight manner. In this case a constriction of a limited portion of the circumference is dispensed with; a cylindrical bore is sufficient.

Inventive seals are especially suitable for closing off lubricating openings, which are often provided in redundant fashion in machinery, but which, because of their position, for example, are not actually needed for lubrication and therefore have to be sealed off. Inventive seals can be used especially in the guide carriages of linear guides. A guide carriage of this type can comprise a support body, which can be supported by rolling elements on a guide rail. This support body can be provided with plastic parts, which are provided with lubrication openings for lubricating the rolling element channel, which holds the rolling elements. In the inventive manner, the previously described bore is used as a lubrication opening, wherein the screw is screwed into the appropriately adapted bore.

BRIEF DESCRIPTION OF THE DRAWINGS

The invention is explained in greater detail below on the basis of two exemplary embodiments, which are illustrated in the total of six figures.

DETAILED DESCRIPTION OF THE INVENTION

Figure 1:
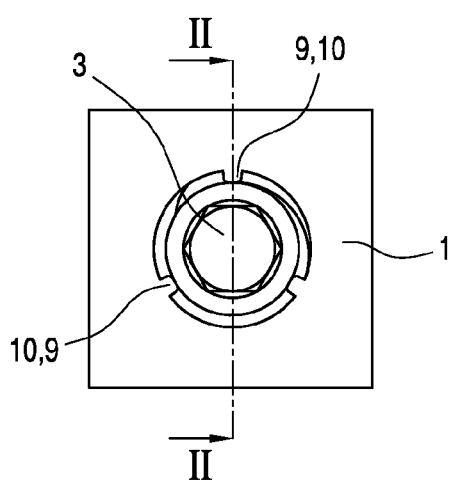
FIG. 1 shows a top view of an inventive seal.

The inventive seal of an opening of a bore 2 provided in a component 1 shown in FIGS. 1-4 is provided according to the invention with a threaded screw 3 The screw 3 comprises a core shaft 4 with a core diameter, wherein a thread 5 wraps helically around the core shaft 4. The screw 3 engages in the bore 2, wherein, by means of the thread 5, material of the component 1 is displaced to create a mating thread 6—therefore an internal thread—in the wall 7 of the bore 2. The material is merely pushed aside and is not cut away and removed.

The diameter of the bore 2 is larger than the core diameter of the core shaft 4. The outside diameter of the thread 5 is larger than the inside diameter of the bore 2, so that, in the manner described, the thread 5 creates the mating thread 6.

Figure 2:
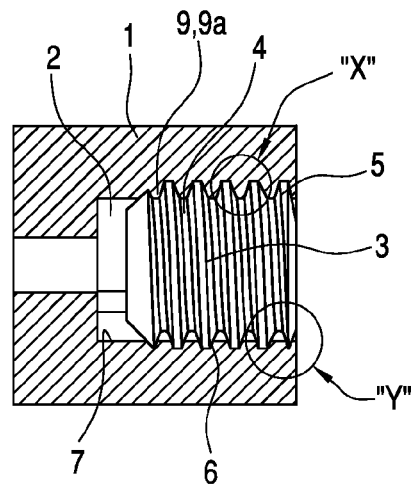
FIG. 2 shows a longitudinal cross section of the inventive seal of FIG. 1 along the cross-sectional line II-II in FIG. 1.
Figure 4:

Furthermore, helical channel 8 is provided, which is located between the core shaft 4 of the screw 5 and the wall 7 of the bore 2, and which is delimited by the thread 5. This helical channel 8 is shown in FIG. 2, and an enlarged diagram of part of it is shown in FIG. 4. This helical channel 8 is in the form of a groove, which winds along the thread 5 of the screw 3. The helical channel is formed because, as specified according to the invention, the diameter of the bore 2 is larger than the core diameter of the core shaft 4. In a favorable manner, the displaced material can escape into this helical channel 8, wherein, however, the previously mentioned diameters are coordinated in such a way that even after the material is displaced the helical channel remains preserved.

The material-free helical channel makes it easy to screw the screw 3 into the bore 2, wherein a cracking of the component 1 is avoided. The invention avoids stress peaks in the component 1 which could lead to undesirable fractures. Undesirable stress peaks could occur when there is no space for the displaced material of the component to go. In this situation, excessive compressive stresses would be exerted unfavorably between the screw and the component 1, which could lead to the failure of the component 1. The invention, however, avoids these undesirable disadvantages in the manner described.

To guarantee that, for example, no lubricant can escape through the helical channel 8, it is provided according to the invention that the helical channel 8 is interrupted at a minimum of one point in a liquid-tight and/or gas-tight manner. In the exemplary embodiment, this is achieved by providing sealing strips 9, which are arranged at three points distributed around the circumference of the bore, which extend along the bore 2, and which bear in a liquid-tight and/or gas-tight manner against the wall 7 of the bore on one side and against the core shaft and the thread 5 of the screw 3 on the other side. Accordingly, the helical channel 8 is interrupted at a plurality of points by sealing strip sections 9a, so that no lubricant can flow through the helical channel 8. In the exemplary embodiment, the helical channel 8 is interrupted five times by each sealing strip 9, namely, once per turn. Overall, therefore, in the exemplary embodiment, the helical channel 8 is interrupted at a total of 15 points, so that it is ensured that no lubricant can drain off undesirably. Of course, more or fewer sealing strips are possible, and the number of times the channel is interrupted can also be varied.

In the cross section of FIG. 2, it can be clearly seen that, in the cross-sectional area above the axis of the bore, the sealing strip 9 bears with a sealing action in the manner described, in which the helically formed channel 8 can be seen underneath the axis of the bore.

Figure 3:
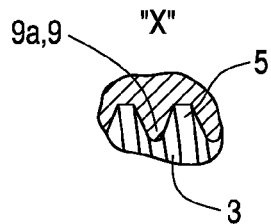
FIGS. 3, 4 show enlarged details of FIG. 2.

FIG. 3 shows an enlarged diagram of the sealing strip 9 and its engagement in the grooves of the thread 5 of the screw 3.

In the exemplary embodiment, each of the sealing strips 9 is in the form of a bead 10, formed on the component 1 as an integral part of that component. This bead 10 projects radially inward from the bore wall 7 and extends along the axis of the bore. This bead can consist of the same material as the component 1. In the exemplary embodiment, the component 1 is produced from plastic by injection-molding, wherein the bead 10 can be easily incorporated through the design of the injection mold. An inventive variant can consist in providing a softer plastic for the bead and a more rigid plastic for the component 1, which the so-called two-component injection technique makes fundamentally possible.

Figure 5:
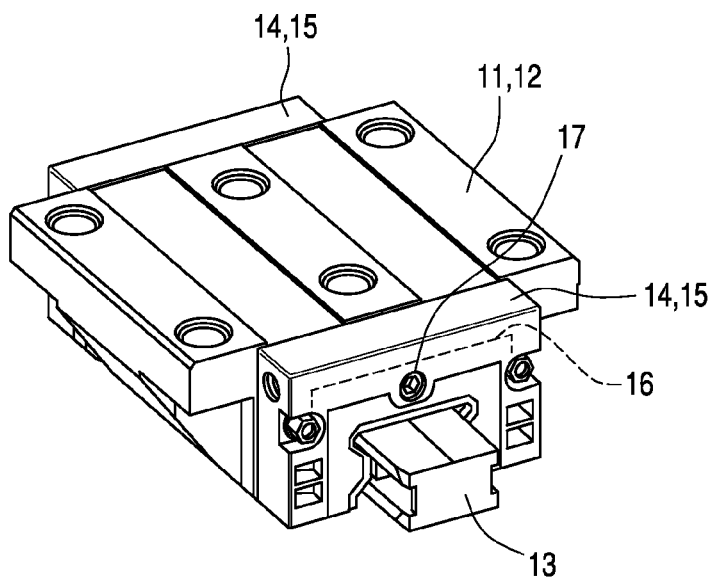
FIG. 5 shows a guide carriage of a linear guide with an inventive seal.
Figure 6:
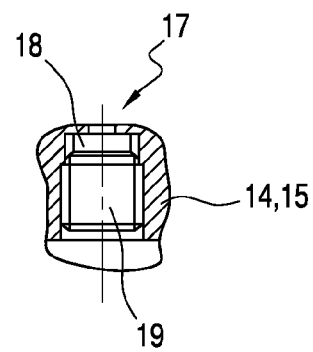
FIG. 6 shows an enlarged detail of FIG. 5.

FIGS. 5 and 6 show a guide carriage 11 provided with an inventive seal. The guide carriage 11 comprises a support body 12, which is supported by rolling elements (not shown) on a guide rail 13. At both end surfaces of the guide carriage 11, head pieces 15, formed by plastic parts 14, are arranged, which, among other things, are provided with lubricant channels 16, merely indicated in the diagram, to convey lubricant to the rolling elements and to the rolling element raceways when relubrication is necessary. The lubricant can be supplied externally by way of connected lubricating nipples. A standard lubrication opening 17, which is sealed in the inventive manner, is provided in the exemplary embodiment, but not required.

The enlarged view according to FIG. 6 shows the lubrication opening 17 with a bore 18, wherein a screw, designed as a threaded pin 19, is screwed into the bore 18 in the inventive manner. This means that the core diameter of the threaded pin 19 is again smaller than the diameter of the bore 18, wherein, furthermore, a helical channel (not shown here) is interrupted at a minimum of one point in a liquid-tight and/or gas-tight manner.

When the diameter of the bore and the core diameter of the screw being used are coordinated with each other in the inventive manner, a simple and reliable screwed joint and inventive seal are provided, in which stress peaks in the component provided with the bore are avoided, wherein at the same time a proper seal of the helical channel is also guaranteed.

LIST OF REFERENCE NUMBERS

1 Component
2 Bore
3 Threaded Screw
4 Core Shaft
5 Screw Thread
6 Mating Thread
7 Bore Wall
8 Helical Channel
9 Sealing Strip
9a Section of a Sealing Strip
10 Bead
11 Guide Carriage
12 Support Body
13 Guide Rail
14 Plastic Part
15 Head Piece
16 Lubricant Channel
17 Lubrication Opening
18 Bore
19 Threaded Pin

The invention claimed is:

1. A seal of an opening of a bore provided in a component with a threaded screw, around a core shaft of which a helical screw thread is arranged, wherein the screw engages in the bore and the thread creates a mating thread in a wall of the bore, wherein a bore diameter of the bore is larger than a diameter of the core shaft, and wherein a helical channel, which is located between the core shaft of the screw and the wall of the bore, and which is delimited by the thread, is interrupted at a minimum of one point in a liquid-tight and/or gas-tight manner.

2. The seal according to claim 1, wherein the bore comprises a radial constriction at a minimum of one point on a circumference, wherein a radial distance between the radial constriction and the wall opposing the bore is dimensioned in such a way that, after the screw has been screwed in, the radial constriction interrupts the helical channel in a liquid-tight and/or gas-tight manner.

3. The seal according to claim 2, wherein the radial constriction is a flattened area.

4. The seal according to claim 2, wherein the radial distance is equal to or less than the diameter of the core shaft of the screw.

5. The seal according to claim 1, wherein a sealing strip, which extends along the bore, is arranged between the screw and the component, and the sealing strip bears in a liquid-tight and/or gas-tight manner against the wall of the bore on one side and against the core shaft and the thread of the screw on the other side.

6. The seal according to claim 5, wherein the sealing strip is divided by the thread of the screw into a plurality of sealing strip sections in correspondence with a number of turns of the thread, wherein each sealing strip section rests in the helical channel against the wall of the bore on one side and against the core shaft and the thread of the screw on the other side in a liquid-tight and/or gas-tight manner.

7. The seal according to claim 5, wherein the sealing strip is designed as a bead formed as an integral part of the component.

8. The seal according to claim 7, wherein the bead projects radially inward from the bore wall and extends along an axis of the bore.

9. The seal according to claim 1, wherein the helical channel is interrupted in a liquid-tight and/or gas-tight manner at several separate points distributed around a circumference of the bore.

10. A guide carriage of a linear guide with a support body, which is supported by rolling elements on a guide rail, and with plastic parts connected to the support body, which are provided with lubricating openings for lubrication of a rolling element channel holding the rolling elements, according to claim 1, wherein the component forms the plastic parts and wherein the bore forms the lubrication openings.

* * * * *